| United States Patent [19] | [11] Patent Number: 4,868,147 |
| Pearson et al. | [45] Date of Patent: Sep. 19, 1989 |

[54] ALUMINA OF HIGH MACROPOROSITY AND STABILITY

[75] Inventors: Michael J. Pearson, Castro Valley; William A. Belding, Pleasanton, both of Calif.

[73] Assignee: LaRoche Chemicals, Inc., Baton Rouge, La.

[21] Appl. No.: 177,233

[22] Filed: Apr. 1, 1988

[51] Int. Cl.$^4$ .......................... B01J 21/12; B01J 27/32
[52] U.S. Cl. ..................................... 502/238; 502/231; 502/263
[58] Field of Search ......................... 502/231, 263, 238

[56] References Cited

U.S. PATENT DOCUMENTS

| 2,310,278 | 2/1943 | Connolly | 502/263 |
| 2,483,131 | 9/1949 | Garrison | 502/231 |
| 2,830,106 | 4/1958 | Good et al. | 502/231 |
| 2,874,193 | 2/1959 | Dijkstra | 502/231 |
| 3,662,002 | 5/1972 | Magerlein et al. | 502/263 |
| 4,392,988 | 7/1983 | Dobson et al. | 502/263 |

*Primary Examiner*—Carl F. Dees
*Attorney, Agent, or Firm*—Andrew E. Barlay

[57] ABSTRACT

A calcined and shaped alumina, exhibiting a stabilized, high pore volume and a low surace area together with high strength, is made from an alumina, such as pseudo-boehmite or chi-rho-eta alumina or mixtures of different alumina species. The stabilized product exhibits a total porosity of at least about 0.4 cc/g, a surface area within the range of about 2-20 m$^2$/g. The porosity is stabilized by treatment of the alumina, prior to calcination, with a combination of silica and an inorganic fluoride. The stabilized alumina product can be readily utilized as an adsorbent or a catalyst support, particularly in applications where the catalyst is subjected to high temperatures.

11 Claims, No Drawings

ALUMINA OF HIGH MACROPOROSITY AND STABILITY

BACKGROUND OF THE INVENTION

This invention relates to a calcined, shaped alumina possessing a stabilized, high pore volume and a low surface area. More particularly, the present invention concerns a stabilized alumina shape of high total pore volume and low surface area prepared by treatment of an alumina with a stabilizing combination of silica and an inorganic fluoride, followed by calcination at high temperature.

For many catalyst applications it is important to provide a catalyst substrate or support which exhibits a high pore volume. The high porosity of the catalyst support or substrate allows the incorporation of catalytic promoters into the substrate and thus provide an active catalyst. Alumina-based catalyst supports or substrates are commonly employed since many aluminas possess the desired pore volume and pore size distribution which allow their combination with catalytic promoters. In addition, the alumina support itself does, in many instances, exhibit catalytic properties due to the active surface area of the alumina support. Narrow pore size distribution is also a preferred property of aluminas, in case of being employed as an adsorbent, selective adsorption can be achieved, and materials, having a size outside of the pore size range of the adsorbent will not be able to penetrate the pores of the adsorbent.

Low surface aluminas with controlled volume distribution in the 1 micron pore diameter range, such as prepared by the method of the invention, are especially useful for treatment of impure air. In air purification applications the alumina can be impregnated with a chemical composition, such as potassium permanganate, which removes contaminants by oxidation. Alternatively, aluminas, as produced by the instant invention, possessing low surface area and narrow pore size distribution, can be employed as supports for deodorizers or air freshening compounds, releasing air purifying compounds at a slow, controllable rate due to the narrow pore size distribution in the above-mentioned range.

In the event the catalyst is to be utilized at high temperatures or the catalyst is exposed to high temperature excursions, the stability of the alumina substrate becomes of major importance. When exposed to high temperatures for example in excess of about 1000° C., alumina substrates not only alter their crystalline phases, but they also undergo other physical changes, for example the surface area, the porosity and/or the pore volume of the alumina also change, generally in an undesired direction. Activity of the catalyst can be significantly affected when the surface area decreases due to high temperature exposure. To alter the pore size distribution in a beneficial manner, i.e. to eliminate pores of very small diameter, it is customary to subject the alumina substrate to temperatures in excess of about 1500° C. This however, as mentioned before, causes changes in the pore volume, it generally shrinks, which further reduces the activity of the alumina-based catalyst. Consequently, in order to provide an alumina-based catalyst support which performs in a desired manner, the substrate has to be treated to stabilize certain of its required properties.

In U.S. Pat. No. 2,630,617 alumina pebbles, used as heat exchange media at temperatures in excess of about 1650° C., were stabilized against breakage and attrition by addition of small quantities of alkaline earth fluorides. The incorporation of the alkaline earth metal fluorides in the lightly calcined starting material, consisting of alpha corundum crystals, inhibited the further growth of the alpha corundum crystals when pebbles were made from the mixture and the pebbles were exposed to the above-mentioned high temperatures. No stabilization of the pore volume, the surface area or the pore size distribution were achieved. As a matter of fact, the addition of the alkaline earth metal fluoride to the alpha corundum acted, as shown in the patent, acts as a sintering agent or densifier resulting in the elimination of the pores and voids in the pebbles.

U.S. Pat. No. 4,003,851 discloses an alumina catalyst support free of thermal shrinkage and of phase change due to stabilization by exposure for a period of 24 hours to temperatures at about 980° C. The process as disclosed avoids the incorporation of stabilizers in the alumina support for fear that such stabilizers may interfere with the performance of the catalyst made from the stabilized support. However, the high temperature-long term treatment disclosed in the reference admittedly results in shrinkage and consequent loss of pore volume. Also, due to the shrinkage, an unfavorable pore size distribution can be expected. These detrimental properties, derived by the high temperature treatment disclosed, counterbalance any beneficial effect that a stabilizer may have on the catalytic activity of a substrate stabilized with a chemical agent.

In U.S. Pat. No. 4,220,559 a high temperature-stable, alumina-based catalyst is described. The catalyst, used for catalyzing combustion reactions at 1000°-1400° C., is stabilized against phase transformation at high temperatures by incorporation of certain stabilizers, such as mixtures of the oxides of strontium or barium with silica, zirconia or stannous oxide. These stabilizers will assure that, at the high application temperatures, alpha alumina formation will be minimized and thus the active surface area of the catalyst will be retained for extended periods. The stabilizer mixtures employed in this reference reduce the surface area loss of the catalyst at the high temperatures employed in the combustion reactions. However, shrinkage of the pore volume and change in the pore size distribution are not readily achieved since the mixtures used may impart mineralizing effects which allow retention of the surface area, but not the pore volume.

It has now been discovered that an alumina adsorbent, support or substrate can be readily stabilized against high temperature deterioration, such as surface area loss and pore volume shrinkage by stabilizing the substrate with a synergistically acting mixture of silica and an inorganic fluoride.

DETAILED DESCRIPTION OF THE INVENTION

This invention relates to an alumina stabilized against pore volume and pore size distribution changes at high temperatures. More particularly, it concerns a calcined alumina shape, stabilized by treating the alumina, prior to calcination, with a stabilizing quantity of a synergistically acting mixture of silica and an inorganic fluoride.

In the present process an alumina species, such as pseudoboehmite, chi-rho-eta transitional alumina, gibbsite or the like, or mixtures of these aluminas, are utilized for the preparation of a shaped, calcined and alumina product. In a preferred embodiment a mixture of aluminas are utilized and one alumina constituent of the mixture is a pseudoboehmitic alumina, the structure of which can be determined by X-ray diffraction using copper Kα radiation. For the pseudoboehmitic alumina used in this invention the diffraction peak of greatest intensity appears at 6.5–6.8 angstroms and its pseudoboehmite content can be readily established by measuring the area under the 14.5°-2Θ diffraction peak. Generally, it is advantageous to employ a pseudoboehmitic alumina which has a pseudoboehmite content of not less than about 25% by weight. This type of pseudoboehmite can be readily prepared in accordance with the manufacturing method disclosed in detail in U.S. Pat. No. 3,630,670 (Bell et al). Other methods, resulting in the production of pseudoboehmite of the structure defined hereinabove, can also be employed.

In the preferred embodiment the other alumina constituent of the mixture, utilized in the preparation of the stabilized alumina of the present invention, is gibbsite or an alumina exhibiting, prior to calcination, a crystalline structure composed of chi, rho and eta phases. This type of alumina is generally prepared from alumina hydrate ($Al_2O_3.3H_2O$) by subjecting the alumina hydrate to flash calcination. Flash calcination is accomplished by contacting the alumina hydrate particles with a high temperature gas for a short period of time, generally for a period of less than about a minute, usually only for a few seconds. U.S. Pat. No. 3,226,191 (H. E. Osment et al) discloses a suitable method for the preparation of alumina having chi-rho-eta transitional phases using the flash calcination process. The transitional alumina, used in the present invention, can be prepared by any conventional method which provides the desired chi-rho-eta transitional structure for the alumina.

For the preparation of the preferred alumina composition of the present invention generally about 50-95%, preferably 60-90% by weight pseudoboehmitic alumina is utilized, the balance being the chi-rho-eta transitional alumina. The differing aluminas, having particle size distributions which allow their ready admixture, are then combined. It is of importance that a uniform admixture is obtained in the mixing step, since the uniformity of the admixture affects the properties of the shapes made from the mixture.

It is to be understood, that for the preparation of the stabilized alumina shape of the present invention it is not necessary to employ a mixture of the pseudoboemitic and chi-rho-eta aluminas. The calcined, stabilized shape may be readily made from pseudoboehmite or chi-rho-eta alumina alone, or as a matter of fact, from gibbsite or other alumina species taken alone or in combination. The embodiments described hereinbefore and in the following description only indicate the preferred alumina compositions utilized in the process.

The mixture of the pseudoboehmitic alumina and chi-rho-eta alumina is then combined with the stabilizing composition of the instant invention. The stabilizing composition used to impart high temperature stability to the alumina composition consist of a mixture of a silica-containing compound and an inorganic fluoride selected from the group consisting essentially of sodium fluoride (NaF), ammonium fluoride ($NH_4F$), aluminum fluoride ($AlF_3$), hydrogen fluoride de (HF), fluosilicic acid ($H_2SiF_6$) or mixtures of these fluorides. The silica-containing constituent of the stabilizing composition can be a sodium silicate or a variation thereof, for example the commonly utilized water glass $Na_2O.xSiO_2$ where x=3-5, or sodium metasilicate ($Na_2SiO_3$). It is also possible to incorporate the desired silica content in the alumina compound by use of a silica sol or other well-dispersed silica source.

The quantity of silica-containing material found to be an effective stabilizer for the calcined alumina shape is in the range from about 0.2 to about 5.0% by weight of the stabilized composition. Thus, in order to achieve this stabilizing quantity in the calcined alumina shape, one has to calculate the silica content of the starting material and thus determine the amount to be incorporated in the mixture of the pseudoboehmitic and chi-rho-eta alumina. For example, if an aqueous solution of sodium silicate is utilized, then the water and the sodium contents of the silica-containing stabilizer must be first determined in order to obtain the final, desired $SiO_2$ content in the calcined alumina shape.

The fluoridic salts, which were found to impart stabilizing properties to the calcined alumina shapes in combination with the $SiO_2$-containing compounds, as mentioned before, can be selected from the group consisting essentially of NaF, $NH_4F$, HF, $AlF_3$, $H_2SiF_6$ and their mixtures. In the case of these salts, the stabilizing quantity of fluoride (F) to be present in the calcined alumina shape is in the range from about 0.02 to about 1.00% by weight of the stabilized composition. If a volatile fluoride compound, such as $NH_4F$, is used, the volatility of the ammonia derivative during the calcination step must be taken into account.

It was found that unless a mixture of both a silica-containing salt and a fluoridic compound is utilized for stabilizing the alumina composition, the stabilizing effect will be lower. This clearly indicates a synergistic effect between the fluoride and the $SiO_2$. The reason for such synergism is not known and it has not been demonstrated previously for the preparation of stabilized alumina products.

Incorporation of the stabilizing composition in the aluminas to be stabilized can be accomplished either during the mixing of the gibbsitic or pseudoboehmitic and chi-rhoeta aluminas or during the shaping step of the already mixed aluminas. It is also possible to add the stabilizing composition to the already shaped alumina mixture. In this case the stabilizing composition is generally used as an impregnant. In the event the incorporation of the stabilizing composition occurs during the mixing of the pseudoboehmitic and transitional aluminas, the stabilizing composition can be added either individually or in combination, in solution or in solid form. Again, uniform admixture is a requirement. If the stabilizing composition is incorporated during the shaping of the mixture of aluminas, then it is preferable to add the composition either as a solution or as a dispersion. The dispersion or solution can be used as a wetting agent for the shaping step.

The mixture of the gibbsitic or pseudoboehmitic alumina and transitional alumina is shaped to obtain a catalyst substrate which can be readily employed for catalytic reactions. Shaping of the alumina mixture can be accomplished by well-known conventional methods, for example by forming spheres in a rotating pan, by extrusion or by any other method resulting in spheres, tablets, extrudates of differing shape. In the event spheres are to be made from the mixture of the aluminas, the sphere forming process described in U.S. Pat. No. 3,222,129 (Osment et al) can be utilized with good results. For certain catalyst applications a high porosity is required. This can be achieved by the incorporation of a combustible material in the mixture of aluminas either during mixing or after shaping through impregnation, for example impregnation with a polyvinyl alcohol or latex composition. In most of the shaping operations moisture is utilized to assist in the shaping, this moisture is generally removed by drying the formed shapes. This drying operation, which usually takes place at temperatures in excess of about 100° C., can be applied to the shapes formed from the mixture of the aluminas.

The shapes are then subjected to a calcination step to obtain the stabilized shapes of the present invention. Calcination is usually accomplished in conventional calcining equipment, such as kilns, rotary or stationary, muffle furnaces or shaft kilns and the like. The temperatures employed for the calcination of the alumina composition of the present invention is within the range from about 1200° to about 1500° C., preferably within the range from about 1300° to about 1400° C. for a time at least about an hour, preferably between 2–4 hours.

The resulting calcined shapes exhibit a high stability when exposed to temperatures in excess of about 1000° C. for extended periods without materially affecting the total pore volume or the pore volume distribution of the stabilized substrate. The calcined shapes also exhibit a narrow pore size distribution which is preferred for many applications. Thus, it has been found that the novel, stabilized calcined alumina shapes possess such a narrow pore size distribution where at least about 75% of the total pores have a diameter within the range from about 0.2 to about 1.2 microns.

The following examples further illustrate the novel aspects of the present invention.

EXAMPLE I

A shaped, high temperature-stable calcined alumina substrate was made by first forming a mixture from pseudo-boehmitic and transitional aluminas. The mixture contained 33% by weight pseudoboehmitic alumina having a pseudo-boehmite content of more than about 90% by weight as determined by subjecting the alumina to X-ray diffraction determination under $K\alpha$ radiation. The balance of the mixture was a transitional alumina having a chi-rho-eta structure. The transitional alumina was prepared from alumina hydrate ($Al_2O_3.3H_2O$) by subjecting the alumina hydrate to flash calcination in accordance with the method disclosed in detail in U.S. Pat. No. 3,226,191. From the mixture of the pseudoboehmitic alumina and transitional alumina spheres were formed in accordance with the process disclosed in detail in U.S. Pat. No. 3,222,129. The spheres were activated at about 400° C. for a period of about 2 hours to provide an activated alumina shape having a total pore volume of 0.83 cc/g. The activated shapes were then step-wise impregnated with aqueous solutions of $Na_2O.3.3SiO_2$ and NaF. The quantity of stabilizing agents incorporated in the shapes was calculated to achieve final concentrations of 1.0% by weight $SiO_2$ and 0.1% by weight F (based on the total weight of the calcined and stabilized shape) in the calcined shapes. The impregnated shapes were calcined in a gas-fired furnace at about 1350° C. and then subjected to analysis. A comparison was also made by calcining alumina shapes made from the same alumina composition without addition of the stabilizing compound. The results are shown in Table 1.

TABLE 1

| Physical Properties | Alumina Samples | |
|---|---|---|
| | Stabilized | Control |
| Total pore volume in cc/g | 0.653 | 0.490 |
| Median pore diam. in angstroms | 0.92 | 0.41 |
| Crush strength in kg. | 0.72 | 0.36 |
| Surface (BET) in $m^2/g$ | 3.4 | 8.5 |

Both the stabilized alumina and the control were then subjected to a high temperature test at a temperature of 1450° C. for a time period of 24 hours. Subsequently, the physical properties of these aluminas were compared. The results of the comparison are shown in Table 2.

TABLE 2

| Physical Properties | Alumina Samples | |
|---|---|---|
| | Stabilized | Control |
| Total pore volume in cc/g | 0.635 | 0.350 |
| Median pore diam. in angstroms | 0.95 | 0.68 |

EXAMPLE II

A stabilized alumina was made by forming a mixture from pseudoboehmitic alumina (pseudoboehmite content in excess of 95% by weight) and flash-calcined chi-rho-eta alumina. The mixture contained 80% by weight pseudoboehmitic alumina, balance chi-rho-eta alumina. The stabilizing composition, containing $Na_2O.3.3SiO_2$ and $NH_4F$, was incorporated in the alumina admixture during the shaping step in such an amount as to provide 0.075% F and 0.6% by weight $SiO_2$ in the calcined shapes. The shapes containing the stabilizing composition were then dried and calcined at the following temperatures: 1300°, 1350°, 1400° and 1450° C. The shapes were kept at each temperature for a period of 2 hours and the total pore volume, the median pore diameter and the strength were determined for each temperature. The results were tabulated and are shown in Table 3.

TABLE 3

| Physical Properties | Alumina Samples Temperature °C. | | | |
|---|---|---|---|---|
| | 1300° | 1350° | 1400° | 1450° |
| Total pore vol. cc/g | 0.631 | 0.617 | 0.579 | 0.579 |
| Median pore diam. angstroms | 0.92 | 0.89 | 0.86 | 0.96 |
| Strength in kg. | 0.494 | 0.531 | 0.735 | 0.844 |

EXAMPLE III

A shaped, spherical, alumina substrate was made from pseudoboehmitic alumina containing in excess of about 95% by weight of pseudoboehmite. The spheres were thermally-treated at about 400° C. for a period of about 2 hours to provide an activated shape having a total pore volume of 0.95 cc/g. The activated shapes were then step-wise impregnated with aqueous solutions of $Na_2O.3.3SiO_2$ and $NH_4F$. The quantity of stabilizing agents incorporated in the shapes was calculated to achieve final concentrations of 1.5% $SiO_2$ and 0.1% F in the calcined stabilized shapes, based on the total weight of the calcined, stabilized shapes. The impregnated shapes were then calcined in a gas-fired furnace at about 1350° C. and then subjected to analysis. A comparison was also made by calcining alumina shapes made from the same pseudoboehmitic alumina without the addition of the stabilizing compositions. The results were tabulated and are shown in Table 4.

From the results obtained it can be clearly observed that the control sample exhibits a significantly lower pore volume than the stabilized sample and in addition the median pore diameter of the control falls in a generally undesirable range.

TABLE 4

| Physical Properties | Alumina Samples | |
| --- | --- | --- |
| | Stabilized | Control |
| Total pore volume cc/g | 0.500 | 0.321 |
| Median pore diam. in angstroms | 0.96 | 0.15 |
| Crush strength in kg/cm$^2$ | 53.7 | 89.5 |

EXMPLE IV

Stabilized, calcined alumina shapes were made from gibbsite. The gibbsite was first activated at about 400° C. and then cellulosic fibers, in an amount equivalent to about 12% by weight of the total weight of the mixture, were added to the activated gibbsite. The mixture was formed into spheres and the spheres were cured in a moist atmosphere, then dried and reactivated in air at a temperature of about 500° C. The temperature employed was sufficient to result in the total combustion of the cellulosic fiber content of the shapes. The alumina shapes had a total pore volume of 0.75 cc/g. The shapes were impregnated with aqueous solutions of $Na_2O0.3.3SiO_2$ and $NH_4F$ to yield a calcined product containing 1.0% $SiO_2$ and 0.1% F, based on the total weight of the stabilized spheres. The alumina shapes were then calcined at about 1350° C. and analysed. The results are shown in Table 5. From the results it can be observed that the stabilized shapes have high pore volume and a desirable median pore size distribution.

TABLE 5

| Physical Properties | Alumina Sample |
| --- | --- |
| Total pore volume in cc/g | 0.65 |
| Median pore diam. in angstroms | 0.92 |
| Crush strength in kg. | 0.63 |

The stabilized aluminas prepared by the instant invention have remarkably constant pore volume distribution up to an operational range of 1350° C. Thereafter, the pore volume declines in a very small degree, however, the median pore diameter remains essentially the same. For this reason the novel, stabilized alumina can be readily employed as a catalyst substrate for high temperature operations without experiencing significant loss in catalytic activity due to the change in total pore volume and median pore diameter. These reasons also apply to an adsorbent made from the novel, stabilized alumina composition.

What is claimed is

1. A process for imparting high temperature stability to calcined alumina shapes which comprises:
   (a) selecting an alumina from the group consisting essentially of pseudoboehmite, chi-rho-eta transitional alumina, gibbsite or the like and mixtures thereof;
   (b) adding to the alumina a stabilizing quantity of a mixture consisting of an $SiO_2$ source and an inorganic fluoride, wherein the inorganic fluoride is selected from the group consisting essentially of sodium fluoride, ammonium fluoride, hydrogen fluoride, fluosilicic acid and mixtures of these, the stabilizing quantity to be added to the admixture being calculated in such a manner as to obtain in the calcined alumina shape an $SiO_2$ content in the range from about 0.2 to about 5.0% and a fluoride (F) content from about 0.02 to about 1.00%, both by weight of the stabilized alumina shapes;
   (c) shaping the alumina-stabilizer admixture;
   (d) calcining the shapes at a temperature range within about 1200° to about 1500° C. for a time period of at least one hour; and
   (e) recovering a stabilized alumina shape having a surface area in the range from about 2 to about 20M$^2$/g and a narrow pore size distribution wherein at least 75% of the total pores have a pore diameter within the range from about 2.0 to about 1.2 microns.

2. A process for imparting high temperature stability to calcined alumina shapes which comprises:
   (a) admixing pseudoboehmite and chi-rho-eta alumina or gibbsite in such a ratio as to obtain a 50-95% by weight pseudoboehmite content in the admixture, balance chi-rho-eta alumina or gibbsite;
   (b) adding to the admixture a stabilizing quantity of a mixture consisting of an $SiO_2$ source and an inorganic fluoride, wherein the inorganic fluoride is selected from the group consisting essentially of sodium fluoride, ammonium fluoride, aluminum fluoride, hydrogen fluoride, fluosilicic acid and mixtures of these, the stabilizing quantity to be added to the admixture being calculated in such a manner as to obtain in the calcined alumina shape an $SiO_2$ content in the range from about 0.2 to about 5.0% and a fluoride (F) content from about 0.02 to about 1.00%, both by weight of the stabilized alumina shapes;
   (c) shaping the admixture containing the stabilizer;
   (d) calcining the shapes at a temperature within the range from about 1200° to about 1500° C. for a time period of at least 1 hour; and
   (e) recovering a stabilized calcined alumina shape.

3. Process according to claim 2, wherein the pseudoboehmite content of the admixture is within the range from about 60% to about 90 by weight of the admixture and the balance is chi-rho-eta alumina or gibbsite.

4. Process according to claim 1 or claim 2, wherein the inorganic fluoride is selected from the group consisting essentially of sodium fluoride, ammonium fluoride and hydrogen fluoride or mixtures thereof.

5. Process according to claim 1 or claim 2, wherein the $SiO_2$ source for the stabilizing composition is a water-soluble silica-containing salt or silica sol.

6. Process according to claim 1 or claim 2, wherein the stabilizing composition is incorporated in the alumina or admixture of aluminas after the shaping step, but before the calcination step.

7. Process according to claim 1 or claim 2, wherein the shapes are calcined within the temperature range from about 1300° to about 1400° C.

8. Process according to claim 1 or claim 2, wherein the calcined shape is a sphere.

9. A high temperature-stable calcined alumina shape characterized by a total pore volume of at least about 0.4 cc/g, a BET surface area after calcination within the range from about 2 to about 20 m$^2$/g and a narrow pore size distribution wherein at least about 75% of the total pores have a pore diameter within the range from about 0.2 to about 1.2 microns, the high temperature stable calcined shape being prepared from an alumina selected from the group consisting essentially of pseudoboehmite, chi-rho-eta, gibbsite or the like and admixtures thereof, the shape containing a stabilizing quantity of a mixture consisting of $SiO_2$ source and an inorganic fluoride.

10. The high temperature-stable shape of claim 9, wherein the shape is made from a mixture of pseudoboehmite and chi-rho-eta alumina and the mixture contains from about 50 to about 95% by weight pseudoboehmite, balance chirho-eta alumina.

11. The high temperature-stable shape of claim 9, wherein the shape contains from about 0.2 to about 5.0% by weight $SiO_2$ and from about 0.02 to about 1.00% by weight of fluoride (F).

* * * * *